United States Patent
Rosas-Maxemin et al.

(10) Patent No.: US 12,243,270 B2
(45) Date of Patent: Mar. 4, 2025

(54) DYNAMIC IMAGE-BASED PARKING MANAGEMENT SYSTEMS AND METHODS OF OPERATION THEREOF

(71) Applicant: PIED PARKER, INC., Sacramento, CA (US)

(72) Inventors: Gianni Rosas-Maxemin, Sacramento, CA (US); George Azzi, Sacramento, CA (US); Callam Poynter, Sacramento, CA (US); Robert Mazzola, Sacramento, CA (US)

(73) Assignee: PIED PARKER, INC., Sacramento, CA (US)

( * ) Notice: Subject to any disclaimer, the term of this patent is extended or adjusted under 35 U.S.C. 154(b) by 0 days.

(21) Appl. No.: 17/493,795

(22) Filed: Oct. 4, 2021

(65) Prior Publication Data
US 2022/0108474 A1 Apr. 7, 2022

Related U.S. Application Data

(60) Provisional application No. 63/087,872, filed on Oct. 5, 2020.

(51) Int. Cl.
*G06T 7/80* (2017.01)
*G06T 7/70* (2017.01)
(Continued)

(52) U.S. Cl.
CPC .............. *G06T 7/80* (2017.01); *G06T 7/70* (2017.01); *G06V 20/52* (2022.01); *H04N 23/64* (2023.01);
(Continued)

(58) Field of Classification Search
CPC .... G06T 7/80; G06T 7/70; G06T 7/73; G06T 2207/30264; G06V 20/52; G06V 20/586;
(Continued)

(56) References Cited

U.S. PATENT DOCUMENTS

| | | | | |
|---|---|---|---|---|
| 7,825,829 B2* | 11/2010 | Madsen | ............... | H04N 23/73 |
| | | | | 382/105 |
| 8,558,888 B2* | 10/2013 | Roskowski | ............. | H04N 7/18 |
| | | | | 348/143 |
| 9,100,572 B2* | 8/2015 | Rodriguez-Serrano | ..................... | |
| | | | | G06V 20/584 |
| 9,672,434 B2* | 6/2017 | Wu | ....................... | G06V 20/52 |
| (Continued) | | | | |

FOREIGN PATENT DOCUMENTS

| | | | |
|---|---|---|---|
| KR | 10-1268321 B1 | 5/2013 | |
| KR | 10-1310103 B1 | 9/2013 | |
| (Continued) | | | |

OTHER PUBLICATIONS

International Search Report and Written Opinion, dated Jan. 27, 2022, for the corresponding International Application No. PCT/US2021/053661 in 11 pages.

*Primary Examiner* — Boubacar Abdou Tchoussou
(74) *Attorney, Agent, or Firm* — Straylight LLP

(57) ABSTRACT

The technologies regarding dynamic image-based parking systems and methods of operation thereof. An example method for operating a camera-based parking management system includes: activating an AI-enabled camera covering a parking area responsive to detecting a parking object; capturing a snapshot of the parking area using the AI-enabled camera; transmitting the snapshot to an edge processor to identify parking object(s) shown in the snapshot; determining that the parking object shown in the snapshot is not capable of being identified with a predefined degree of certainty based on a machine learning model; responsive to the determining: identifying first one or more characteristics about the parking object that potentially reduce identification accuracy; and identifying second one or more characteristics about the snapshot (e.g., imaging angle, orientation, resolution, network speed) that potentially reduce identifi-
(Continued)

cation accuracy; and automatically adjusting one or more settings of the AI-enabled camera to capture a second snapshot.

14 Claims, 6 Drawing Sheets

(51) Int. Cl.
*G06V 20/52* (2022.01)
*H04N 23/60* (2023.01)
*H04N 23/661* (2023.01)
*H04N 23/80* (2023.01)

(52) U.S. Cl.
CPC ........... *H04N 23/661* (2023.01); *H04N 23/80* (2023.01); *G06T 2207/30264* (2013.01)

(58) Field of Classification Search
CPC ...... H04N 23/64; H04N 23/661; H04N 23/80; H04N 23/61; H04N 23/67; H04N 23/695; H04N 23/72
See application file for complete search history.

(56) References Cited

U.S. PATENT DOCUMENTS

| | | | |
|---|---|---|---|
| 10,008,115 B2* | 6/2018 | Singh | G08G 1/168 |
| 10,013,616 B2* | 7/2018 | Gehrke | G06F 18/22 |
| 11,076,088 B2* | 7/2021 | Nishimura | G06F 18/214 |
| 11,107,296 B2* | 8/2021 | Vespia | G06Q 50/40 |
| 11,113,841 B1* | 9/2021 | Zelenskiy | G06V 10/44 |
| 11,132,224 B2* | 9/2021 | Zhu | G06F 16/24568 |
| 11,164,027 B2* | 11/2021 | Wang | G06F 18/22 |
| 11,443,555 B2* | 9/2022 | Sriram | G06V 10/25 |
| 11,455,805 B2* | 9/2022 | Lu | G06V 20/586 |
| 2004/0264564 A1 | 12/2004 | Senger | |
| 2009/0219392 A1* | 9/2009 | Roskowski | H04N 7/18 348/143 |
| 2014/0210646 A1* | 7/2014 | Subramanya | G06V 20/52 348/148 |
| 2017/0278311 A1* | 9/2017 | Vespia | G06V 20/52 |
| 2021/0092280 A1* | 3/2021 | Nishimura | G06V 10/764 |
| 2022/0371512 A1* | 11/2022 | Tatematsu | G06V 20/625 |
| 2022/0392345 A1* | 12/2022 | Wada | G06V 20/586 |

FOREIGN PATENT DOCUMENTS

| | | |
|---|---|---|
| KR | 10-2016-0061132 A | 5/2016 |
| KR | 10-1873202 B1 | 7/2018 |

* cited by examiner

5000

- Activate an AI-enabled camera covering a parking area responsive to detecting a parking object  501
- Capture a snapshot (an image or a video clip) of the parking area using the AI-enabled camera  503
- Transmit the sanpshot to an edge processor to identify one or more parking objects shown in the snapshot  505
- Whether a parking object shown in the snapshot may be identified with a predefined degree of certainty based on a machine learning model  507

Yes / No

- Identify characteristics about the parking object (e.g., movement, angle, or color contrast) that potentially reduce identification accuracy  509
- Identify characteristics about the snapshot (e.g., imaging angle, orientation, resolution, network speed) that potentially reduce identification accuracy  511
- Automatically adjust setting of the AI-enabled camera to capture an additional snapshot  513
- Identify the parking object based on one or more snapshots  515

FIG. 5

DYNAMIC IMAGE-BASED PARKING MANAGEMENT SYSTEMS AND METHODS OF OPERATION THEREOF

CROSS-REFERENCE TO RELATED APPLICATIONS

This application claims the benefit of U.S. Provisional Patent Application No. 63/087,872 filed on Oct. 5, 2020, the disclosure of which is hereby expressly incorporated by reference in its entirety.

TECHNICAL FIELD

The present disclosure generally to parking systems and more specifically to dynamic image-based parking management systems and methods of operation thereof.

BACKGROUND

According to a recent Forbes article, fewer than 2% of parking transactions occur online. Katina Stefanova, Jul. 15, 2020. "Parking is Dead. Long Live Parking." Forbes. https://www.forbes.com/sites/katinastefanova/2020/07/15/parking-is-dead-long-live-parking/#24e200047ba0. In a post-COVID 19 world, it has become more crucial than ever for contactless technology to work seamlessly with parking technology to reduce possible exposure to airborne pathogens. As centers of commerce begin to bring back business and people take their personal vehicles to these businesses, parking will become an ever-more important commodity at these places of business.

Conventional parking systems either are manually operated or use cameras that are generally operated in a static environment where the cameras are ill-equipped to deal with dynamic environmental conditions or disturbances. Namely, conventional cameras in a parking lot are set on a site-by-site basis. No additional features are included to fit the environmental condition of the parking lot. Environmental conditions limit the use of conventional parking systems. For instance, an open-air parking space may be exposed to direct sunlight, a parking lot may be underground and dimly lit, or a parking space on the street with lots of vehicle lights, traffic lights, and street lights that shut off and on intermittently.

Moreover, urban environments such as the downtown areas occasionally have Internet connection issues due to the large Internet traffic. These bandwidth issues will affect the data transmission of the parking system, especially the video transmission, increasing the risk of recognition errors. It is thus imperative to adjust camera settings to improve the quality of the video, particularly during high traffic times.

Parking management systems equipped with one or more dynamic AI cameras having License Plate Recognition (LPR) functions and capabilities to detect environmental conditions including the lighting condition and the Internet speed, and a self-adjust mechanism to compensate for environmental conditions are therefore desired. The disclosed parking management systems and methods are directed to overcoming the technical problems discussed above.

SUMMARY

Technologies relating to dynamic image-based parking management systems and methods of operation thereof are disclosed.

An example method for operating a camera-based parking management system includes: activating an AI-enabled camera covering a parking area responsive to detecting a parking object; capturing a snapshot of the parking area using the AI-enabled camera; transmitting the snapshot to an edge processor to identify one or more parking objects shown in the snapshot; determining that the parking object shown in the snapshot is not capable of being identified with a predefined degree of certainty based on a machine learning model; responsive to the determining: identifying first one or more characteristics about the parking object that potentially reduce identification accuracy; and identifying second one or more characteristics about the snapshot (e.g., imaging angle, orientation, resolution, network speed) that potentially reduce identification accuracy; and automatically adjusting one or more settings of the AI-enabled camera to capture a second snapshot.

In some implementations, the method further comprises identifying the parking object with the predefined degree of certainty based on the snapshot and the second snapshot.

In some implementations, the snapshot is an image, an audio clip or a video clip.

In some implementations, the first one or more characteristics about the parking object include movement of the parking object, an angle of the parking object to the AI-enabled camera, and color contrast of the parking object.

In some implementations, the second one or more characteristics about the snapshot include an imaging angle of the AI-enabled camera, an orientation of the of the AI-enabled camera, a resolution of the snapshot, a network speed of a network connection between the AI-enabled camera and the edge processor.

In some implementations, the second one or more characteristics about the snapshot further include: busy times of a day, lighting issues of the day, network availability of the day, or a combination thereof.

In some implementations, automatically adjusting one or more settings of the AI-enabled camera to capture a second snapshot includes: caching of one or more snapshots during a slow period of network throughput at the AI-enabled camera before sending the one or more snapshot to the edge processor.

An example parking management system comprising: an AI-enabled camera, an edge computing processor, and a set of executable computer instructions, which when executed, causes the parking management system to: activate an AI-enabled camera covering a parking area responsive to detecting a parking object; capture a snapshot of the parking area using the AI-enabled camera; transmitting the snapshot to an edge processor to identify one or more parking objects shown in the snapshot; determine that the parking object shown in the snapshot is not capable of being identified with a predefined degree of certainty based on a machine learning model; responsive to the determining: identify first one or more characteristics about the parking object that potentially reduce identification accuracy; and identify second one or more characteristics about the snapshot (e.g., imaging angle, orientation, resolution, network speed) that potentially reduce identification accuracy; and automatically adjust one or more settings of the AI-enabled camera to capture a second snapshot.

In some implementations, the set of executable computer instructions further comprising instruction for identifying the parking object with the predefined degree of certainty based on the snapshot and the second snapshot.

In some implementations, the snapshot is an image, an audio clip or a video clip.

In some implementations, the first one or more characteristics about the parking object include movement of the parking object, an angle of the parking object to the AI-enabled camera, and color contrast of the parking object.

In some implementations, the second one or more characteristics about the snapshot include an imaging angle of the AI-enabled camera, an orientation of the of the AI-enabled camera, a resolution of the snapshot, a network speed of a network connection between the AI-enabled camera and the edge processor.

In some implementations, the second one or more characteristics about the snapshot further include: busy times of a day, lighting issues of the day, network availability of the day, or a combination thereof.

In some implementations, automatically adjusting one or more settings of the AI-enabled camera to capture a second snapshot includes: caching of one or more snapshots during a slow period of network throughput at the AI-enabled camera before sending the one or more snapshot to the edge processor.

An example non-transitory computer-readable storage medium storing one or more programs, the one or more programs comprising instructions, which when executed by a computing system with one or more processors, cause the computing system to: activate an AI-enabled camera covering a parking area responsive to detecting a parking object; capture a snapshot of the parking area using the AI-enabled camera; transmitting the snapshot to an edge processor to identify one or more parking objects shown in the snapshot; determine that the parking object shown in the snapshot is not capable of being identified with a predefined degree of certainty based on a machine learning model; responsive to the determining: identify first one or more characteristics about the parking object that potentially reduce identification accuracy; and identify second one or more characteristics about the snapshot (e.g., imaging angle, orientation, resolution, network speed) that potentially reduce identification accuracy; and automatically adjust one or more settings of the AI-enabled camera to capture a second snapshot.

In some implementations, the set of executable computer instructions further comprising instruction for identifying the parking object with the predefined degree of certainty based on the snapshot and the second snapshot.

In some implementations, the snapshot is an image, an audio clip or a video clip.

In some implementations, the first one or more characteristics about the parking object include movement of the parking object, an angle of the parking object to the AI-enabled camera, and color contrast of the parking object.

In some implementations, the second one or more characteristics about the snapshot include an imaging angle of the AI-enabled camera, an orientation of the of the AI-enabled camera, a resolution of the snapshot, a network speed of a network connection between the AI-enabled camera and the edge processor.

In some implementations, the second one or more characteristics about the snapshot further include: busy times of a day, lighting issues of the day, network availability of the day, or a combination thereof.

In some implementations, automatically adjusting one or more settings of the AI-enabled camera to capture a second snapshot includes: caching of one or more snapshots during a slow period of network throughput at the AI-enabled camera before sending the one or more snapshot to the edge processor.

BRIEF DESCRIPTION OF THE DRAWINGS

FIG. 5 is a flowchart illustrating an example method of operating the example parking management system in accordance with some implementations of the present disclosure.

The implementations disclosed herein are illustrated by way of example, and not by way of limitation, in the figures of the accompanying drawings. Like reference numerals refer to corresponding parts throughout the drawings.

DETAILED DESCRIPTION

The technologies relating to dynamic image-based parking management systems are disclosed. The technologies described in the present disclosure may provide the following technical advantages.

First, unlike conventional cameras, which are usually not capable of self-adjusting based on such fast-changing environmental conditions as object movement, as well as lighting and network connections, and thus often fail to provide accurate focusing, the disclosed technologies enable a plurality of cameras to self-adjust their settings dynamically as suitable to its environment, producing clearer, more accurate imaging. For instance, when the lighting in a given environment is insufficient, an image or video that a camera may record could be include significant blurring. By using the disclosed technologies, however, the camera may be zoomed in and out automatically, until it can capture an image of a vehicle's license plate with a predefined clarity. In another instance, when the speed of a computer network (though which the camera connects to a computer server) available at a parking lot is low, the quality of an image or video captured by the camera may be automatically reduced, until the image of the license plate of a vehicle or the video of the vehicle may be transmitted to the computer server so as to enable vehicle management. The disclosed technologies, thus, significantly improve the accuracy of a parking management system and reduces the likelihood of incorrect vehicle or component recognition.

Furthermore, many camera settings require manual adjustments, which may be burdensome and infeasible in some circumstances. For example, focus can be adjusted manually or automatically, however, the desired target for identification is not always automatically focused on correctly. Moreover, objects in a camera view may not be well positioned when an image is taken. For example, a camera's zoom may have to be manually adjusted in order to capture a moving vehicle, e.g., depending on the vehicle's movement speed and direction. Moreover, many conventional camera systems have motion detection capabilities as standard, however, detection area(s) must be specified (default is the whole image), and with that, sensitivity and threshold values.

Second, the disclosed technologies use one or more Artificial-Intelligence (AI)-enabled cameras to capture not only a license plate of a vehicle, but also use various characteristics of the vehicle, such as the license plate number, the color of the vehicle, the size of the vehicle, the number and occupancy status of a parking space. These AI-enabled parking management technologies, thus, provide more precise usage analysis of a parking lot with many spaces or users' behavior through big data analysis.

Figure 1:
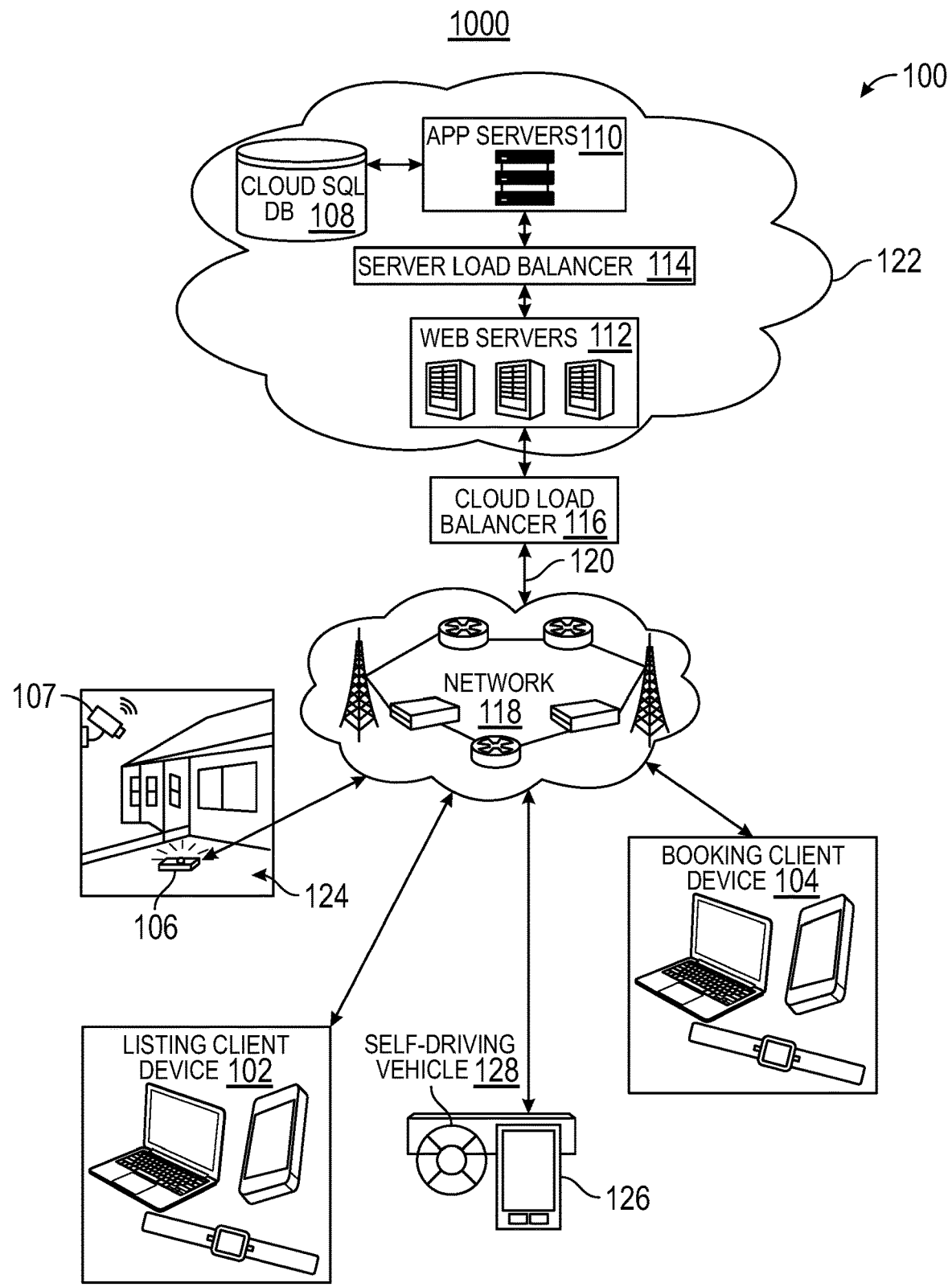
FIG. 1 is a schematic diagram illustrating an example parking management system in accordance with some implementations of the present disclosure.

FIG. 1 is a schematic diagram 1000 illustrating a parking management system 100 in accordance with some implementations of the present disclosure. Parking management system 100 may include one or more listing client devices 102, one or more booking client devices 104, one or more parking sensors 106, or a combination thereof, each communicatively coupled to one or more databases 108, one or more application servers 110, one or more web servers 112, one or more server load balancers 114, one or more cloud load balancers 116, or a combination thereof over a communications network 118.

In some embodiments, communications network 118 may be any multi-hop network that covers one or more regions, countries, continents, or a combination thereof. Examples of the communications network 118 may include a cellular network such as a 3G network, a 4G network, a 5G network, a long-term evolution (LTE) network; a sonic communication network; a satellite network; a wide area network such as the Internet, or a combination thereof. In some examples, web servers 112, application servers 110, server load balancers 114, cloud load balancers 116, or a combination thereof can be communicatively coupled to communications network 118 through connections 120. In some examples, connections 120 are wired connections, wireless connections, or a combination thereof. In some examples, wireless connections include dedicated short-range communications (DSRC), satellite, fire wire, network, USB, Wi-Fi, radio-frequency identification (RFID), BLUETOOTH, GPS/GNSS, Near Field Communication (NFC), Infrared (e.g., GSM infrared), and/or the like and/or using any suitable wireless communication standards and protocols, such as IEEE 802.11 and WiMAX.

In some embodiments, parking management system 100, or a portion therein, include a web and/or mobile application hosted on a computing cloud 122 such as a Windows Azure™ cloud, an Amazon Elastic Computer Cloud (Amazon EC2)™, a Google App Engine™, or a combination thereof. In some examples, parking management system 100 includes a web and/or mobile application that runs on virtual machines hosted on the one or more application servers 110, web servers 112, or a combination thereof. In some examples, computing cloud 122 includes one or more application servers 110, web servers 112, databases 108, server load balancers 114, cloud load balancers, portions therein, or a combination thereof. In some examples, parking management system 100 relies on processing and storage resources provided by the one or more application servers 110, web servers 112, databases 108, server load balancers 114, cloud load balancers 116, or a combination thereof.

In some embodiments, a cloud load balancer 116 provides traffic load balancing and distributes client requests among one or more web servers 112. In some examples, one or more web servers 112 may include an HTTP server or rely on computing cloud 122 to handle HTTP requests. In some examples, a web server 112 is instantiated and managed by the computing cloud 122.

In some embodiments, a server load balancer 114 balances interactions between web servers 112 and one or more application servers 110. In some examples, an application server 110 handles application logic and interacts with a database 108 to store data and application states. In some examples, a web server 112, an application server 110, or a combination thereof, includes one or more rack-mount servers, cluster servers, blade servers, main frames, dedicated desktops, laptops, or a combination thereof.

In some examples, a database 108 includes one or more SQL databases. An application server 110 may interface with one or more SQL servers managing the SQL databases. In some examples, application data and application states are stored in a cloud-managed SQL database. In some implementations, database 108 is a document-oriented database including a NoSQL database such as a MongoDB® database.

In some embodiments, application servers 110, web servers 112, cloud load balancers 116, server load balancers 114, and cloud SQL databases 108 are any of the servers, load balancers, and databases described in U.S. Pat. No. 9,176,773, the content of which is hereby incorporated by reference in its entirety.

In some embodiments, a listing client device 102 and a booking client device 104 may be a portable computing device such as a smartphone, a tablet, a laptop, a smartwatch, a personal entertainment device, or a combination thereof. In other implementations, a listing client device 102, a booking client device 104, or a combination thereof include a desktop computer. In some examples, a listing client device 102 is used by a user of parking management system 100 to list one or more parking spaces for rental or lease by other users of the parking management system 100. In some examples, a booking client device 104 is used by a user of the parking management system 100 to book a parking space listed for rental or lease on the parking management system 100.

In some embodiments, a parking management system 100 includes one or more parking sensors 106 and one or more camera systems 107. Parking sensors 106 may be deployed and maintained at a listing location 124. In some implementations, a listing location 124 is a parking space in which a vehicle may be parked. In some examples, a vehicle may be any type of vehicle, including a sedan, a truck, a SUV, a motorcycle, a scooter, a self-balancing scooter (e.g., a SEGWAY scooter), a hoverboard, a drone, a bus, a golf cart, a train, a trolley, an amusement vehicle, a recreational vehicle, a boat, a watercraft, a helicopter, an airplane, a bicycle, and/or the like.

In one implementation, a parking sensor 106 may be a client device such as listing client device 102, booking client device 104, or a component thereof. In some examples, a camera system 107 is located within a proximity to listing location 124. In some implementations, a camera system 107 includes a dynamic AI-enabled camera.

In some embodiments, parking management system 100 is communicatively coupled to a control unit 126 of a self-driving vehicle 128. In some examples, the parking management system 100 receives data or client requests from the control unit 126 of the self-driving vehicle 128. In some examples, self-driving vehicle 128 includes one or more motor vehicles or vessels having an autonomous or semi-autonomous driving mode. In some examples, self-driving vehicle 128 includes vehicles disclosed or discussed in U.S. Pat. Nos. 9,120,485, 8,965,621, and 8,954,217, the contents of which are hereby incorporated by reference in their entirety. Self-driving vehicles may be fully autonomous or semi-autonomous.

Figure 2A:
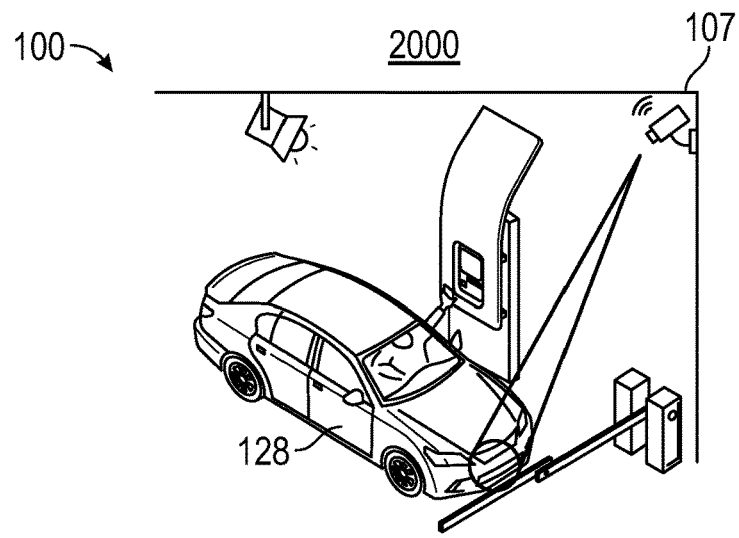
FIGS. 2A-2C are schematic diagrams illustrating example parking management systems in accordance with some implementations of the present disclosure.
Figure 2B:
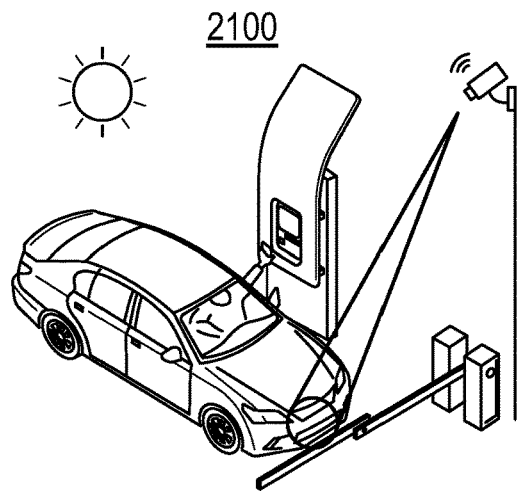
Figure 2C:
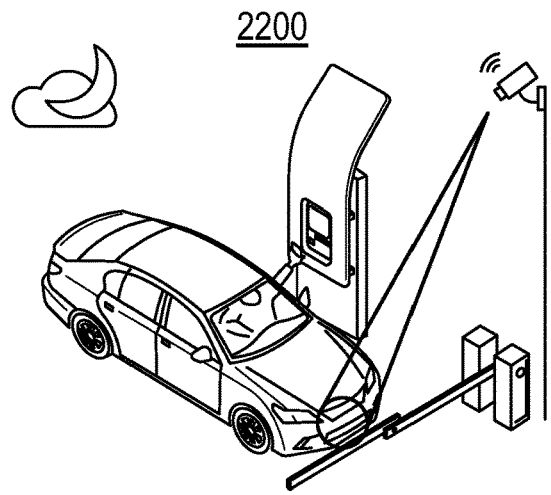

FIGS. 2A-2C are schematic diagrams 2000-2200 illustrating example parking management systems in accordance with some implementations of the present disclosure. As mentioned above, some cameras are not configured to itself-adjust in accordance with environmental conditions. AI-enabled camera system 107, in contrast, is configured to adjust itself to fit the environment of a parking station 124 and to capture or identify one or more license plates of a vehicle more accurately. A parking station 124 may be installed at an area suitable for a vehicle to park or pass through, such as at an entrance/exit to a parking facility, at an individual parking spot, and at an area in front of a stop sign.

In some embodiments, as shown in FIG. 2A, when a parking station 124 is located in a damp and dimly lit parking lot, a motion sensor light (e.g., infrared motion sensor) may be deployed to detect when a vehicle 128 is close. Occasionally, one or more lights present in the vicinity of the parking station 124 may have low luminosity or become non-functional. Conventional cameras may have difficulty identifying a license plate of vehicle 128, when the lighting condition is insufficient for such identification.

In some embodiments, as shown in FIG. 2B, when parking station 124 is aglow with intense light (e.g., from direct sunlight), conventional cameras in the parking lot where parking station 124 is located may have difficulty identifying the license plate of the parking vehicle, for example, due to significant glares, because conventional cameras may take one or more images or videos against the light.

In some embodiments, in the case of FIG. 2C, when parking station 124 is in a place with limited moonlight and little streetlights, or in a place with adverse weather conditions such as fog, wind, rain, hail, snow, or a combination thereof, these weather and lightening conditions may severely limit operation of a conventional parking system.

In some embodiments, camera system 107 is a dynamic AI-enabled camera system with an automatic self-adjustment mechanism to configure itself to fit environmental conditions such as lighting conditions of a parking station. In some examples, when there is plenty of light, an AI-enabled parking camera is configured to capture an image very quickly using reduced shutter time, which produces sharper images, or the AI-enabled parking camera is configure to shrink its aperture to reduce the light that enters the camera lens. In some examples, when there is not much light, an AI-enabled parking camera is configured to increase the shutter time when capturing an image, or AI-enabled parking camera is configured to increase its aperture to increase the light that enters the camera.

In addition to self-adjusting one or more camera settings to fit the environmental conditions (discussed further below), in some implementations, AI-enabled parking camera system 107 is further configured to identify various vehicle or object-specific parameters, e.g., using machine learning technologies discussed below with reference to at least FIG. 5. The one or more vehicle specific-parameters may include a license plate number, a VIN, the make and model of a vehicle, the appearance of a vehicle (e.g., the color, decals, damage, customizations, such as spoilers, after-market additions) in accordance with one or more identifiers transmitted by a device within the vehicle, such as the stereo system projecting a MAC address, RFID chip (e.g., an RFID on a license plate), auditory signatures such as engine noise, or identification of a vehicle occupant (the drive and a passenger) by using facial identification, stickers (e.g., QR code), a BLE tracker, or the like. In some examples, a vehicle sticker may include a QR code that is colored to look like a logo, such as the gray and orange logo of PIED PARKER. A QR code may identify a vehicle as corresponding to a particular user, or, in some cases, multiple drivers corresponding to one vehicle. and the like. In some examples, an object is a pedestrian, a cyclist, a vehicle, a first responder, a license plate, a parking line, a parking marker, a parking sign, a curb, a tree, a road, a terrain, an obstacle, a cone, a side strip, a bridge abutment, a road margin, a traffic signs, or a signal.

In some embodiments, analysis or calculations of the AI-driven camera of the camera system 107 may be processed at computing cloud 122. In some examples, communications between an AI-enabled camera and a computing cloud (e.g., an edge computer system) may be done via standard application programming interfaces (APIs) that may transfer data or instructions between the camera and the computing cloud.

In some implementations, parking management system 100 may include an EMV payment system equipped with a BLE, NFC, RFID, or magnetic stripe reader. In some examples, such a system includes an NFC mobile phone payment kit for parking with several advantages: (1) a user is not required to download any specific software application (or app), and (2) real time entry, exit, or payment is enabled. In these implementations, a parking gate arm may be equipped with an NFC recorder with a control unit, such as a Raspberry Pi control unit. When a user arrives at the gate, awaiting entry into a parking lot, the user may tap the phone to an NFC recorder, upon which a NFC-reading session is initiated, and the access to the parking lot is allowed. When a user is looking to exit the parking lot, the NFC reader installed nearing the gate arm may read the user's smart phone, upon which a parking session is confirmed, and when a payment is processed, the parking session is closed, and exit from the parking lot is enabled.

In some implementations, an NFC recorder is embedded into an AI-enable camera, which may be installed nearing a parking gate. For example, an AI-enabled camera equipped with an NFC recorder is installed for each vehicle lane entering into or exiting from a parking lot and wired to a vehicle loop detector and further to the parking management systems' control unit (e.g., an Edge computing server), which controls a gate arm.

In some examples, an NFC kit is enabled to provide an Apple Pay or Android Pay merchant setup. Such a system enables a faster parking experience, reducing vehicle stops, entering or existing the parking lot or a restricted area within a parking lot, such as an employee-only parking area.

In some examples, the goal of programming an NFC kit is to allow a user with Apple Pay/Android to access a parking lot and pay for parking, without requiring a paper ticket, an installation of an app, a user registration. An NFC kit to be enabled on a parking gate may installed be sold or leased to a parking lot management. This allows a faster deployment with minimal installation costs and downtime. NFC recorders may connect to a Point Of Sales (POS) system, where the POS and an NFC recorder may transact for parking payments. As part of the programming process, a parking management system may determine whether an NFC recorder is configured to tokenize an NFC payment (by way of an Apple Pay or Google Pay transaction), when a user is attempting to enter a parking lot by tapping a user device including a NFC component near an NFC recorder installed about a parking gate.

When a user taps her NFC device about an NFC-enabled gate arm, trying to exit a parking lot, an edge computing system may calculate and charge the appropriate charge, and allow exit. A parking receipt may be generated (without an individual reference number) in the user's Apple Pay (or Android Pay) wallet; an individual reference number may be generated and made available on the user banking or charging statement.

Parking transaction identification: an individual session ID may be created for identification purposes in such events as a loss of network connection, a failed payment, or a loss of a user's NFC payment device. A parking management system may use a session ID to identify one or more transactions associated with a session.

Technologies provided by an AI-enabled camera system may provide such a session ID. For example, images captured and time-stamped by an AI-enable camera may be used to reference an entry into or exit from a parking lot. Each time stamp event associated with a user's parking event (entry, exit, parking, standing, idling, cruising about the parking lot) may be associated with a same session ID. Thus, an AI-enabled camera system may facilitate parking management functions, which usually require additional hardware components.

Figure 3:
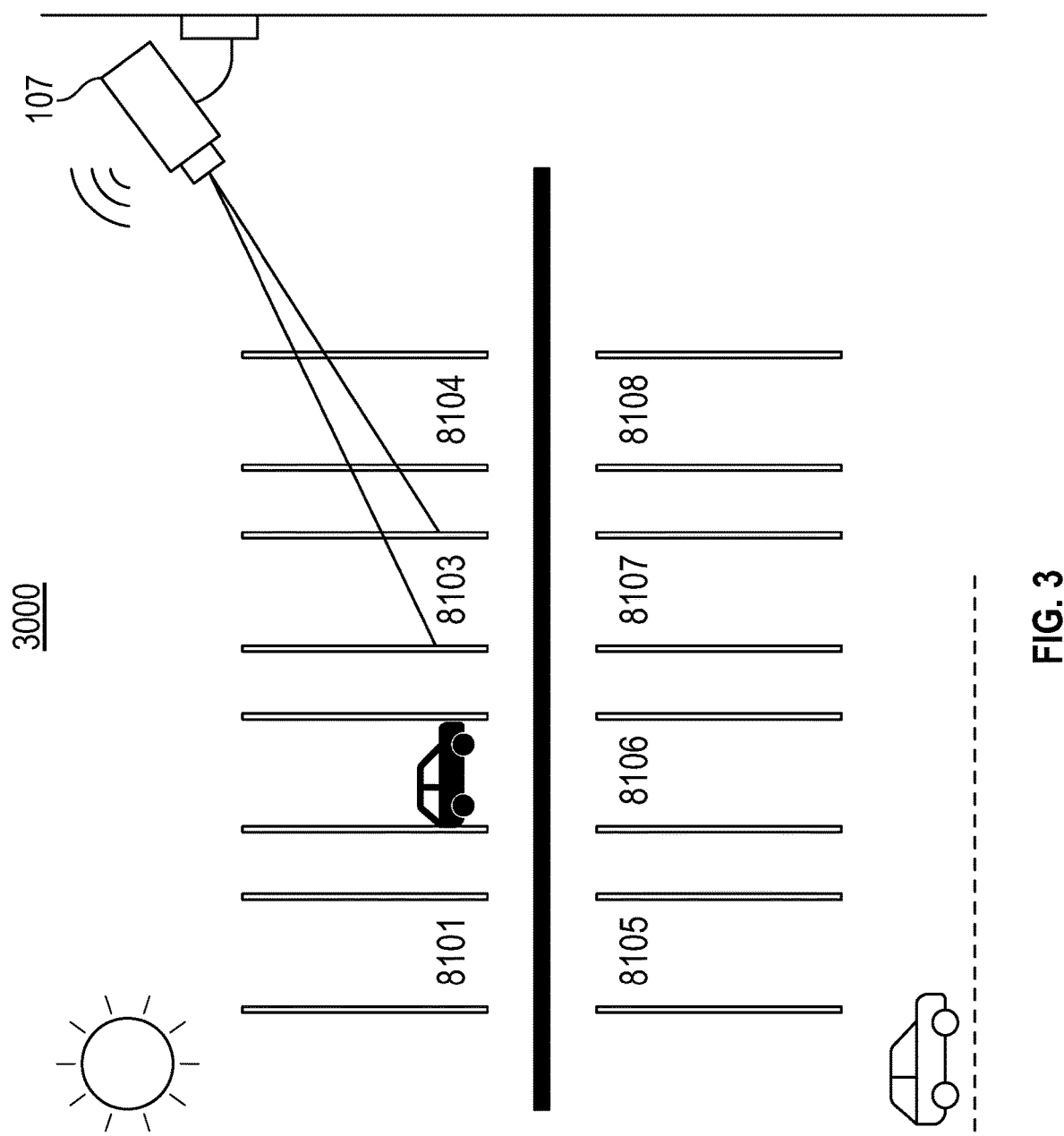
FIG. 3 is a schematic diagram illustrating an example parking management system in accordance with some implementations of the present disclosure.

FIG. 3 is a schematic diagram illustrating an example parking management system 3000 in accordance with some implementations of the present disclosure. As mentioned above, camera system 107 may identify vehicle specific parameters or objects discussed above with respect to FIG. 2. By adjusting the camera setting to fit the environmental condition and identifying vehicle specific parameters, objects, and the like, the parking management system may calculate more precisely the usage of a parking space or users' behavior through big data analysis. In some examples, parking management system 3000 may analyze local users' usual parking time within parking location 8102 using camera system 107 and send the vacancy information of a parking lot to a user en route to the parking lot. In some instances, parking system 107 analyzes parking duration patterns or peak parking hours to adjust a parking fee structure parking locations 8101-8108. Parking locations 8101-8108 may be on a street, within a parking structure, within a driveway, a carousel, or the like. Furthermore, because of its self-adjustment mechanism, the camera system 107 may more accurately record a vehicle's licensing plate number, the vehicle's color, or the number of the empty parking spaces, even in a harsh environment for camera and lighting equipment. Methods of adjustment are further discussed below with respect to FIGS. 4 and 5.

Figure 4:
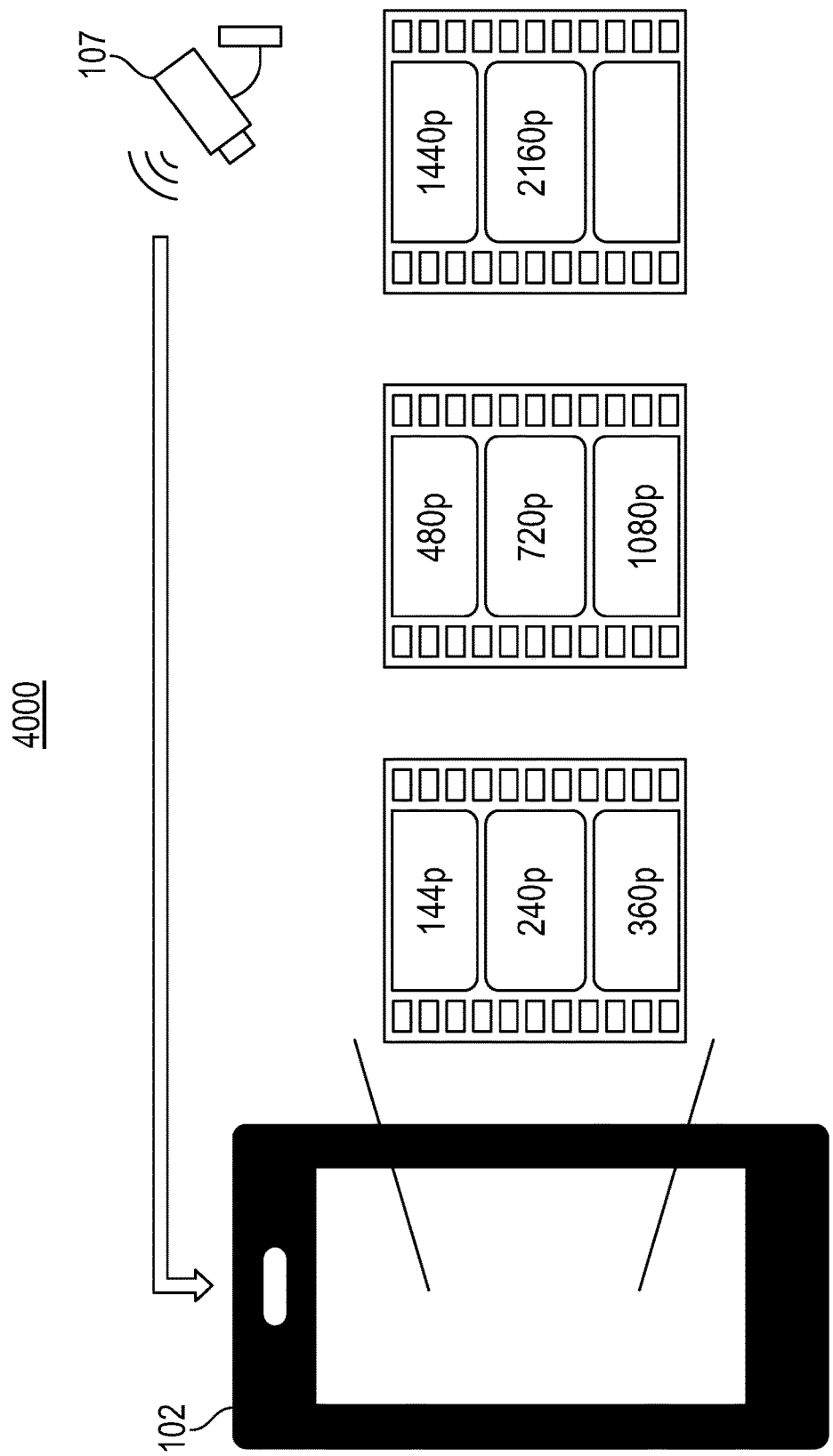
FIG. 4 is a schematic diagram illustrating an example parking management system in accordance with some implementations of the present disclosure.

FIG. 4 is a schematic diagram illustrating an example parking management system 4000 in accordance with some implementations of the present disclosure. In some implementations, the quality of an image or a video clip recorded by AI-enabled camera system 107 is adjusted in accordance with the environment factors associated with a parking space.

In some embodiments, the quality of an image or a video clip recorded by AI-enabled camera system 107 is adjusted in accordance with conditions relating to a computer network connection through which the image or the video clip is transmitted between an edge computing system from AI-enabled camera system 107.

As shown in FIG. 4, after identifying environmental conditions including the lighting condition, the quality of captured image or video, the Internet speed, or the moving speed of a vehicle present in or nearing a parking space, or environmental conditions, AI-enabled camera system 107 may automatically adjusts camera functional settings: for example, by adjusting a camera's focus, zooming in and out, adjusting the camera's shutter time or camera angle, by downscaling or upscaling its quality of image or video, by adjusting models for identifying one or more objects in a parking lot, by adjusting auto iris, 3D noise reduction, backlight compensation, highlight compensation, wide dynamic range, by adjusting a camera's position (e.g., on vertical/horizontal axis or radial axis), by adjusting camera picture settings (e.g., brightness, contrast, saturation, gamma, mirror, or flip), by adjusting exposure settings (e.g., gain or shutter speed), by adjusting a camera's video settings (e.g., resolution or FPS), by adjusting a camera's settings for a certain time of day (before sunrise or after sunset for an uncover parking structure) or weather condition (e.g., fogginess, cloudyness, excessive sunlight, rain, wind, or smoke), or by adjusting a combination thereof. In some examples, these automatic responses are executed by machine learning techniques via computing center 122, which may be a computing cloud or an edge computing center.

In some implementations, the adjustment settings are based on time of day, e.g., busy times of the day, lighting issues of the day, network availability of the day, or a combination thereof. In some implementations, the adjustment according to the Internet speed may be done by analyzing network bandwidth to manage the caching of images during slow periods of network throughput.

FIG. 5 is a flow chart illustrating an example method 5000 for managing a parking system in accordance with some implementations of the present disclosure.

As shown in FIG. 5, the method 5000 includes: activating an AI-enabled camera covering a parking area responsive to detecting a parking object. In some examples, an AI-enabled camera covering a parking area is activated in response to detecting an event such as an object moving or an environmental change (step 501). In response to detecting the event, a snapshot (e.g., a first snapshot) or a video clip (e.g., a first video clip) is captured by an AI-based camera, such as a motion detection or an edge connection is activated (step 503). In some examples, a snapshot includes one from a scan when a connection is made between a user's device and a computer system, triggering detection with a target of the features expected given the specific user. In some examples, a user's device may transmit user data such as a vehicle plate and region details which the computer system may use as an identification target for detection.

In some examples, interactions may include one from a motion detection event received by a computer system signaling the start and end of an event. In some implementations, events may be categorized regionally by establishing multiple detection areas with varying degrees of sensitivity and threshold. For example, detection areas may be specified to distinguish between motion detected in a vehicle lane versus a pedestrian walkway by monitoring where foot traffic is most frequently detected. In some implementations, object detection may be performed to distinguish between pedestrians and vehicles. For example, bounding boxes are determined for each object detected and each box may contribute to a heatmap of positions where the motion of the object is most common.

In some implementations, the motion detector may either be separate sensors or part of a camera. In some implementations, the edge connection is facilitated by an edge computer connected with the cameras and other equipment such as a parking barrier.

In some embodiments, method 5000 further includes transmitting the snapshot to an edge processor to identify one or more parking objects shown in the snapshot (step 505).

In some embodiments, method 5000 further includes determining whether or not the parking object or parking object's state shown in the snapshot is capable of being identified with a predefined degree of certainty based on a machine learning model (step 507).

In some embodiments, method 5000 in response to determining that the parking object shown in the snapshot is capable of being identified with a predefined degree of certainty based on the machine learning model, characteristics of the parking object that potentially reduce identification accuracy are identified (step 509). In some embodiments, method 5000 in response to determining that the parking object or object state shown in the snapshot is capable of being identified with a predefined degree of certainty based on the machine learning model, characteristics of the snapshot taken by the AI-enabled camera that potentially reduce identification accuracy are identified (step 511).

In some implementations, identifying the parking object includes: identifying the status, state, or nature of the parking object. In some examples, the identifying model identifies pedestrians and also can identify a walking pedestrian, a running pedestrian, or a pedestrian with an umbrella, or other object/state. In some examples, a state of the object includes objects under different motions or circumstances. In some examples, the state of an object identified is a vehicle with a front door or a trunk open. The identification of objects and states of objects can be trained by machine learning models disclosed herein.

In some implementations, vehicles may be whitelisted or blacklisted by a parking system including the AI-enabled camera. In some examples, a vehicle's plate may be recognized on the edge and cross referenced against a list of vehicle plates that specify the vehicle should be allowed or prevented access to a structure. In some examples, a particular vehicle may be blacklisted because of its history such as overdue payments or inflicting damage to property or other vehicles. In some examples, a particular vehicle or type of vehicle may be whitelisted because it is a lot operator's vehicle or is an emergency vehicle such as an ambulance or police cruiser.

In some implementations, a supervised or semi-supervised learning technique may be used, providing images of poor quality, images of good quality and the camera setting changed to get there. For example, the poor-quality images may be overexposed or too blurry for recognition of a plate, as opposed to good quality images. In some examples, settings may be manually adjusted to improve recognition quality of an image such that the image is labelled with the settings applied. The mapping of settings from the poor to good may be learned by a machine given labelled images (e.g. ground truth labels).

In some embodiments, a machine learning (ML) model may be trained/tuned based on training data collected from positive recognition, false recognition, and/or other criteria. In some aspects, the ML model may be a deep neural network, Bayesian network, and/or the like and/or combinations thereof. Although various types of ML models may be deployed to refine some aspects for identifying whether a listing location is occupied or not, in some aspects, one or more ML-based classification algorithms may be used, Transfer Learning, Edge Detection Segmentation, or a combination thereof. Such classifiers may include but are not limited to: MobileNet object detector, a Multinomial Naive Bayes classifier, a Bernoulli Naive Bayes classifier, a Perceptron classifier, a Stochastic Gradient Descent (SGD) Classifier, and/or a Passive Aggressive Classifier, and/or the like. Additionally, the ML models may be configured to perform various types of regression, for example, using one or more various regression algorithms, including but not limited to: Stochastic Gradient Descent Regression, and/or Passive Aggressive Regression, etc.

In some implementations, the method 5000 further includes: responsive to the determining: identifying first one or more characteristics about the parking object that potentially reduce identification accuracy; and identifying second one or more characteristics about the snapshot (e.g., imaging angle, orientation, resolution, network speed) that potentially reduce identification accuracy. In some examples, the first one or more characteristics and the second one or more characteristics about the parking object and about the snapshot, respectively, may be referred to as abnormalities.

In some implementations, it may be that the lack of a plate is an abnormality if it is an expected feature, e.g., the front of a motorcycle. In some examples, a vehicle without a plate may not be abnormal, but because majority of vehicles will have one it may be under some circumstances. The vehicle is recognized before recognizing the plate, so if the plate is not recognized, the make, the model, or the color of the vehicle may help distinguish abnormalities by adjusting the identifying model. In some implementations, these may include damage to the object, where the identifying model is trained to distinguish them against an object's undamaged state. In some examples, the plate of a vehicle may have such abnormalities for example. In some implementations, partial VINs may be constructed in place of a vehicle license plate, acting as a fingerprint for a vehicle made up of its various attributes such as make, model, color of a vehicle, etc.

The second one or more characteristics about the snapshot may be referred to as image or video quality issues. An image or video quality issue may be an issue relating to focus, level of zoom, vertical and horizontal position, exposure issues such as shutter speed or grain, picture issues such as brightness, contrast, saturation, gamma, mirror, or flip, video issues such as resolution or frames per second, profile issues such as day or night background lighting, or a combination thereof. In some examples, required adjustments to a camera setting may be applied for an identifying model, and taking another snapshot (e.g., a second snapshot) or video clip (e.g., a second video clip).

In some implementations, the adjustable camera settings include (1) camera focus; (2) camera zoom in/out; (3) camera position vertical/horizontal axis; (4) camera picture setting: brightness, contrast, saturation, gamma, mirror, or flip; (5) camera exposure setting: shutter speed, or gain; (6) camera video setting: resolution, or frames per seconds; (7) camera profile management: day/night settings, or a combination thereof.

In some implementations, the machine learning model may also be adjusted, which may include: training the identifying model to identify different objects or different states of the objects according to machine learning methods disclosed herein.

In some implementations, the adjustment may be calculated by the computing cloud or the edge computing center. Instructions generated by the computing cloud or the edge computing center are then sent to the camera system and executed by the camera system.

In some implementations, the method 5000 further includes automatically adjusting one or more settings of the AI-enabled camera to capture a second snapshot (step 513). The step 505 to step 513 may be repeated until the parking object is identified with the predefined level of certainty.

In some implementations, the computing center, especially the edge computing center is configured to one or more settings of the AI-enabled camera: (1) image controls that may include levels of brightness, contrast, saturation, sharpness and gamma, and applications of axial transformations such as the mirroring or flipping an image; (2) exposure controls that may include anti-flicker frequency, shutter speed and range of gain. Furthermore, the camera may have preset modes of exposure control that adjust the shutter speed and range of gain, including automatic, priority or manual. Moreover, the camera iris may be adjusted manually, or enabled to automatically allow in more or less light; and (3) compensation controls that may include dimensional noise reduction (such as 2DNR and 3DNR), backlight compensation (BLC), highlight compensation (HLC), high-dynamic-range imaging (such as WDR and DWDR). Challenging lighting conditions are compensated for by balancing the light or noise in an image by utilizing camera image sensors, digital signal processors, or combination thereof.

In some implementations, the method further comprises identifying the parking object with the predefined degree of certainty based on the snapshot and the second snapshot.

In some implementations, the snapshot is an image, an audio clip or a video clip.

In some implementations, the first one or more characteristics about the parking object include movement of the parking object, an angle of the parking object to the AI-enabled camera, and color contrast of the parking object.

In some implementations, the second one or more characteristics about the snapshot include an imaging angle of the AI-enabled camera, an orientation of the of the AI-enabled camera, a resolution of the snapshot, a network speed of a network connection between the AI-enabled camera and the edge processor.

In some implementations, the second one or more characteristics about the snapshot further include: busy times of a day, lighting issues of the day, network availability of the day, or a combination thereof.

In some implementations, automatically adjusting one or more settings of the AI-enabled camera to capture a second snapshot includes: caching of one or more snapshots during a slow period of network throughput at the AI-enabled camera before sending the one or more snapshot to the edge processor.

Figure 6:
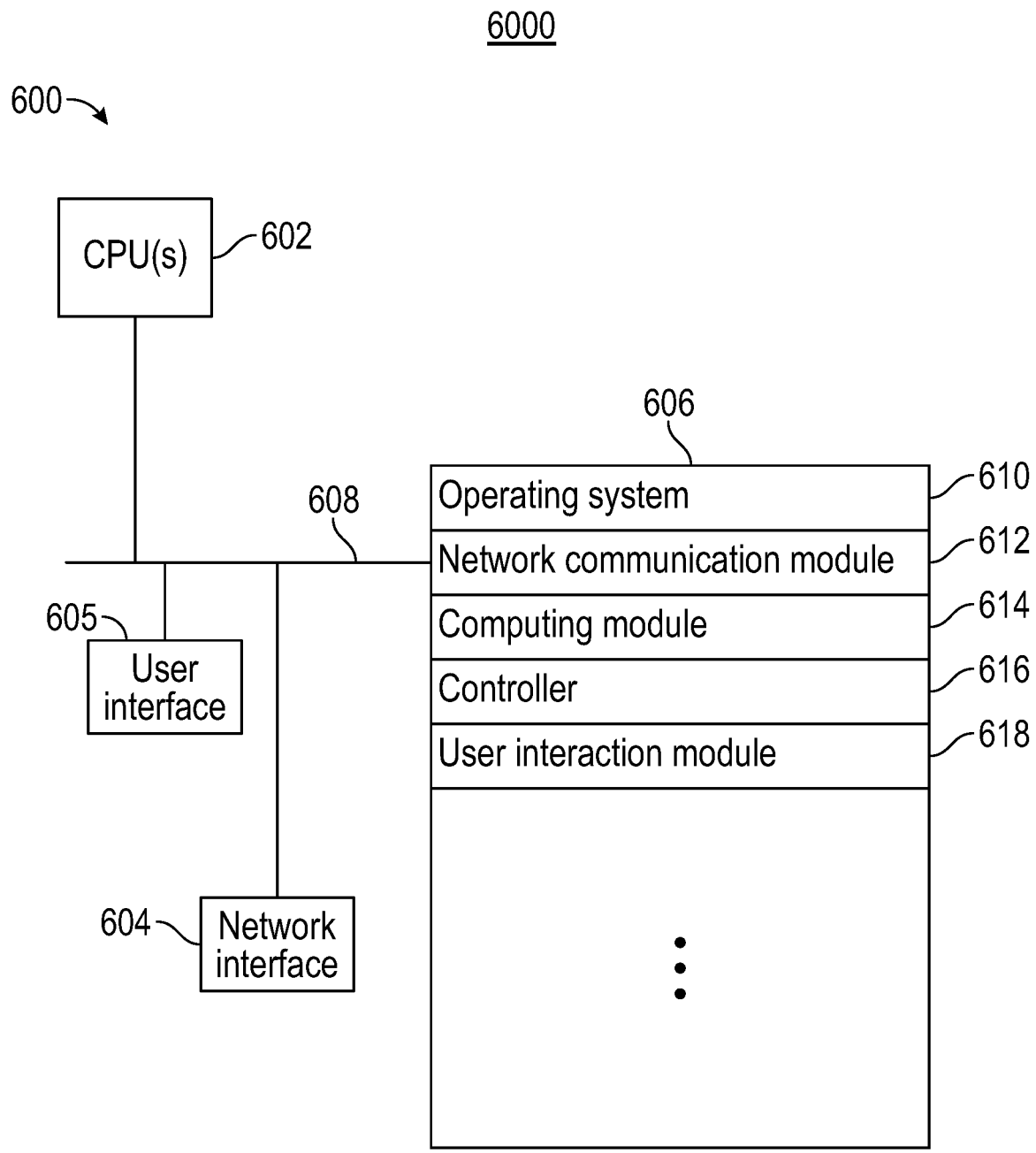
FIG. 6 is a block diagram illustrating an example computing system for operating a parking management system in accordance with some implementations.

FIG. 6 is a block diagram 6000 illustrating an example computing system 600 for implementing a method of operating the parking management system in accordance with some implementations. Computer system 600 may be used to operate at least the parking management system in accordance with some implementations of the present disclosure. The computer system 600 in some implementations includes one or more processing units CPU(s) 602 (also referred to as processors), one or more network interfaces 605, optionally a user interface, a memory 606, and one or more communication buses 608 for interconnecting these components. The communication buses 608 optionally include circuitry (sometimes called a chipset) that interconnects and controls communications between system components. Memory 606 typically includes high-speed random access memory, such as DRAM, SRAM, DDR RAM or other random access solid-state memory devices; and optionally includes non-volatile memory, such as one or more magnetic disk storage devices, optical disk storage devices, flash memory devices, or other non-volatile solid-state storage devices. In some examples, memory 606 optionally includes one or more storage devices remotely located from CPU(s) 602. In some examples, memory 606, or alternatively the non-volatile memory device(s) within memory 606, includes a non-transitory computer-readable storage medium. In some implementations, memory 606 or alternatively the non-transitory computer-readable storage medium stores the following programs, modules, and data structures, or a subset thereof:

- operating system 610 (e.g., an embedded Linux operating system), which includes procedures for handling various basic system services and for performing hardware dependent tasks;
- a network communication module 612 for connecting the computer system with a manufacturing machine via one or more network interfaces (e.g., wired or wireless);
- a computing module 614 for executing programming instructions;
- a controller 616 for controlling a manufacturing machine in accordance with the execution of programming instructions; and
- user interaction module 618 for enabling a user to interact with the computer system 600.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first camera could be termed a second camera, and, similarly, a second camera could be termed the first camera, without changing the meaning of the description, so long as all occurrences of the "first camera" are renamed consistently and all occurrences of the "second camera" are renamed consistently. The first camera and the second camera are both cameras, but they are not the same camera.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method of operating a camera-based parking management system, comprising:
    activating an AI-enabled camera covering a staging area responsive to detecting a vehicle;
    capturing a first snapshot of the staging area using the AI-enabled camera;
    transmitting the first snapshot to an edge processor coupled to the AI-enabled camera to identify one or more objects shown in the first snapshot;
    determining that first object observed in the first snapshot is not capable of being identified with a predefined degree of certainty based on a machine learning model;
    responsive to the determining:
        identifying first one or more characteristics about the environmental conditions surrounding the first object that potentially reduce an identification accuracy of one or more vehicle-specific parameters; and
        identifying second one or more characteristics about the first snapshot that potentially reduce the identification accuracy of one or more vehicle-specific parameters; and
    automatically adjusting one or more settings of the AI-enabled camera to capture a second snapshot based on identifying the first one or more characteristics about the environmental conditions surrounding the first object;
    automatically adjusting one or more settings of the processing of images captured by the AI-enabled camera based on identifying the second one or more characteristics about the first snapshot;
    wherein the second one or more characteristics about the first snapshot include a resolution of the snapshot, network availability based on the time of day, and a network speed of a network connection between the AI-enabled camera and the edge processor;
    capturing the second snapshot of the staging area using the AI-enabled camera;
    determining the first object observed in the first snapshot is capable of being identified with the predefined degree of certainty based on the machine learning model; and
    adjusting the machine learning model based on the adjustment of the settings of the AI-enabled camera and settings of the processing of images captured by the AI-enabled camera.

2. The method of claim 1, further comprising identifying the first object with the predefined degree of certainty based on the first snapshot and the second snapshot.

3. The method of claim 1, wherein the first snapshot is an image, an audio clip, or a video clip.

4. The method of claim 1, wherein the first one or more characteristics about the environmental conditions surrounding the first object include movement of the first object, an angle of the first object to the AI-enabled camera, an orientation of the AI-enabled camera, frames per second of the AI-enabled camera, and color contrast of the first object.

5. The method of claim 1, wherein the automatically adjusting the one or more settings of the AI-enabled camera to capture the second snapshot includes: caching of one or more snapshots during a slow period of network throughput at the AI-enabled camera before sending the one or more snapshots to the edge processor.

6. A parking management system comprising:
    an AI-enabled camera,
    an edge computing processor, and
    a set of executable computer instructions, which when executed, causes the parking management system to:
        activate the AI-enabled camera covering a staging area responsive to detecting a vehicle;
        capture a first snapshot of the staging area using the AI-enabled camera;
        transmit the first snapshot to the edge computing processor to identify one or more objects shown in the first snapshot;
        determine that a first object shown in the first snapshot is not capable of being identified with a predefined degree of certainty based on a machine learning model;
        responsive to the determining:
            identify first one or more characteristics about the environmental conditions surrounding the first object that potentially reduce an identification accuracy of one or more vehicle-specific parameters; and
            identify second one or more characteristics about the first snapshot that potentially reduce the identification accuracy of one or more vehicle-specific parameters; and
        automatically adjust one or more settings of the AI-enabled camera to capture a second snapshot based on identifying the first one or more characteristics about the environmental conditions surrounding the first object;
        automatically adjust one or more settings of the processing of images captured by the AI-enabled camera based on identifying the second one or more characteristics about the first snapshot;

wherein the second one or more characteristics about the first snapshot include a resolution of the snapshot, network availability based on the time of day, and a network speed of a network connection between the AI-enabled camera and the edge computing processor;

capture the second snapshot of the staging area using the AI-enabled camera;

determine the first object observed in the first snapshot is capable of being identified with the predefined degree of certainty based on the machine learning model; and adjust the machine learning model based on the adjustment of the settings of the AI-enabled camera and settings of the processing of images captured by the AI-enabled camera.

7. The parking management system of claim 6, further comprising instructions, which when executed, causes the parking management system to: identify the first object with the predefined degree of certainty based on the first snapshot and the second snapshot.

8. The parking management system of claim 6, wherein the first snapshot is an image, an audio clip, or a video clip.

9. The parking management system of claim 6, wherein the first one or more characteristics about the environmental conditions surrounding the first object include movement of the first object, an angle of the first object to the AI-enabled camera, an orientation of the AI-enabled camera, frames per second of the AI-enabled camera, and color contrast of the first object.

10. The parking management system of claim 6, wherein the automatically adjusting the one or more settings of the AI-enabled camera to capture the second snapshot includes: caching of one or more snapshots during a slow period of network throughput at the AI-enabled camera before sending the one or more snapshots to the edge computing processor.

11. A non-transitory computer-readable storage medium storing one or more programs, the one or more programs comprising instructions, which when executed by a computing system with one or more processors, cause the computing system to:

activate an AI-enabled camera covering a staging area responsive to detecting a vehicle;

capture a first snapshot of the staging area using the AI-enabled camera;

transmit the first snapshot to an edge computing processor to identify one or more objects shown in the first snapshot;

determine that the first object shown in the first snapshot is not capable of being identified with a predefined degree of certainty based on a machine learning model;

responsive to the determining:

identify first one or more characteristics about the environmental conditions surrounding the first object that potentially reduce an identification accuracy of one or more vehicle-specific parameters; and identify second one or more characteristics about the first snapshot that potentially reduce the identification accuracy of one or more vehicle-specific parameters; and automatically adjust one or more settings of the AI-enabled camera to capture a second snapshot to focus on a license plate of the vehicle based on identifying the first one or more characteristics about the environmental conditions surrounding the first object;

automatically adjust one or more settings of the processing of images captured by the AI-enabled camera based on identifying the second one or more characteristics about the first snapshot, wherein the second one or more characteristics about the first snapshot include a resolution of the snapshot, network availability based on the time of day, and a network speed of a network connection between the AI-enabled camera and the edge computing processor;

capturing the second snapshot of the staging area using the AI-enabled camera;

determining the first object observed in the first snapshot is capable of being identified with the predefined degree of certainty based on the machine learning model; and adjusting the machine learning model based on the adjustment of the settings of the AI-enabled camera and settings of the processing of images captured by the AI-enabled camera.

12. The non-transitory computer-readable storage medium of claim 11, further comprising instructions, which when executed, cause the one or more processors to: identify the first object with the predefined degree of certainty based on the first snapshot and the second snapshot.

13. The non-transitory computer-readable storage medium of claim 11, wherein the first snapshot is an image, an audio clip, or a video clip.

14. The non-transitory computer-readable storage medium of claim 11, wherein the first one or more characteristics about the environmental conditions surrounding the first object include movement of the first object, an angle of the first object to the AI-enabled camera, an orientation of the AI-enabled camera, frames per second of the AI-enabled camera, and color contrast of the first object.

* * * * *